(12) United States Patent
Atwater et al.

(10) Patent No.: US 7,026,069 B1
(45) Date of Patent: Apr. 11, 2006

(54) LITHIUM MANGANESE BISMUTH MIXED METAL OXIDE FOR RECHARGEABLE ELECTROCHEMICALS SYSTEMS

(75) Inventors: Terrill B. Atwater, North Plainfield, NJ (US); Arek Suszko, Lakewood, NJ (US)

(73) Assignee: The United States of America as represented by the Secretary of the Army., Washington, DC (US)

( * ) Notice: Subject to any disclaimer, the term of this patent is extended or adjusted under 35 U.S.C. 154(b) by 360 days.

(21) Appl. No.: 10/339,258

(22) Filed: Jan. 2, 2003

(51) Int. Cl.
*H01M 4/58* (2006.01)

(52) U.S. Cl. .............................. 429/231.1; 429/218.1; 429/231.95; 429/224; 252/518.1; 252/519.13; 423/179.5

(58) Field of Classification Search ............. 429/231.1, 429/224, 218.1; 252/518.1, 519.13; 423/599, 423/594.7, 179.5
See application file for complete search history.

(56) References Cited

U.S. PATENT DOCUMENTS 6,489,060 B1 * 12/2002 Zhang et al. ............ 429/231.1

OTHER PUBLICATIONS

Atwater et al. "Thermodynamic and kinetic study of the Li/MnO2 Bi2O3 electrochemical couple", Journal of the Electrochemical Society, vol. 145, No. 3, Mar. 1998, pp. L31-L33.*
Atwater et al. "Electrochemical properties of the Li/MnO2 Bi2O3 couple", Proceedings of the Power Sources Conference (1998), 38th.*

* cited by examiner

*Primary Examiner*—Laura Weiner
(74) *Attorney, Agent, or Firm*—Michael Zelenka; George B. Tereschuk

(57) ABSTRACT

Reacting $MnO_2$, a lithium compound and a bismuth compound produces a lithium battery cathode material for lithium electrochemical systems. The same results can also be achieved by reacting $MnO_2$, lithium, or a compound containing lithium and bismuth, or a compound containing bismuth. Manganese based mixed metal oxides with lithium and bismuth were initially examined as a cathode material for rechargeable lithium and lithium-ion batteries in order to provide a new mixed metal oxide cathode material as the positive electrode in rechargeable lithium and lithium ion electrochemical cells. A stable mixed metal oxide was fabricated through a solid-state reaction between manganese dioxide, a lithium compound and bismuth or a bismuth compound. In addition to the lithium battery cathode material, a lithium manganese bismuth mixed metal oxide cathode, a lithium electrochemical system with a lithium manganese bismuth mixed metal oxide and a rechargeable lithium battery with a lithium manganese bismuth mixed metal oxide cathode are also provided. These devices provide much improved sustained specific capacity of about 120 mAhrs/g and the material exhibits an inherent catalytic behavior for charge transfer.

11 Claims, 4 Drawing Sheets

US 7,026,069 B1

LITHIUM MANGANESE BISMUTH MIXED METAL OXIDE FOR RECHARGEABLE ELECTROCHEMICALS SYSTEMS

GOVERNMENT INTEREST

The invention described herein may be manufactured, used, imported, sold, and licensed by or for the Government of the United States of America without the payment to us of any royalty thereon.

FIELD OF THE INVENTION

The present invention relates generally to the field of electrochemical power sources, and more particularly to rechargeable lithium and lithium-ion batteries using manganese based mixed metal oxide as the positive electrode.

BACKGROUND OF THE INVENTION

Portable batteries with increased energy and power densities are required as the use of portable electronic equipment rapidly continues to increase. Batteries are typically the limiting factor in the performance of most portable commercial and military electronic equipment due to the restrictions on the size, weight and configuration imposed on the equipment by limitations from the power source. In some cases, safety and environmental factors are also significant considerations for deploying a particular power source. Lithium batteries provide high energy density, conformal packaging and improved safety, which make them one of the most promising electrochemical systems under development today.

Lithium batteries use high valence metal oxide materials, which are reduced during the electrochemical reaction. This reaction in rechargeable lithium and rechargeable lithium ion batteries must be fully reversible in order to have a commercially viable cell. Common reversible metal oxide materials used in lithium batteries include: $Li_xMn_2O_4$, $Li_xMnO_2$, $Li_xCoO_2$, $Li_xNiO_2$ and $Li_xNi_yCo_zO2$. These materials remain reversible against lithium whenever lithium subscript "x" is maintained between 0.10 and 0.85 for $Li_xMn_2O_4$, 0.1 and 0.5 for $Li_xMnO_2$ and 0.4 and 0.95 for $Li_xCoO_2$, $Li_xNiO_2$ and $Li_xNi_yCo_zO_2$. However, if the stoichiometry exceeds these limitations, the material undergoes a phase change and is no longer reversible. The primary consequences of the phase change of the material and subsequent irreversibility are that the cell will no longer accept a charge, which makes the cell inoperable. In order to maintain this stoichiometry rigid electronic control is usually employed, but rigid controls such as current and voltage limiters employed at the stack level or cell level are not practical for many situations where lithium batteries are deployed, which makes maintaining reversibility even more critical for lithium electrochemical systems used in portable electronic equipment.

Thus there has been a long-felt need to solve the problems associated with maintaining reversibility in lithium batteries without suffering from the disadvantages, limitations and shortcomings associated with rigid stoichiometry electronic control and phase change. A mixed metal oxide that introduces bismuth into the manganese oxide cathode structure yields a material with reduced charge transfer impedance due to catalytic activity. This reduced charge transfer impedance provides a lower potential charge mechanism avoiding the problems associated with loss of reversibility in lithium batteries without suffering from the disadvantages, limitations and shortcomings associated with rigid stoichiometry electronic control and phase change.

SUMMARY OF THE INVENTION

It is an object of the present invention to provide a lithium manganese bismuth mixed metal oxide cathode material as the positive electrode in rechargeable lithium and lithium ion electrochemical cells.

Another object of the present invention is to provide a lithium manganese bismuth mixed metal oxide cathode material having the general formula $Li_xMnO_2(Bi_2O_3)_y$ as the positive electrode in rechargeable lithium and lithium ion electrochemical cells.

It is still a further object of the present invention is to provide a lithium manganese bismuth mixed metal oxide cathode material having the general formula $Li_xMnO_2(Bi_2O_3)_y$ as the positive electrode in rechargeable lithium and lithium ion electrochemical cells where x is between 0.45 and 0.55, y is between 0.025 and 0.075 and the reversible region for x is between $0.4<x<1.0$.

It is yet another object of the present invention is to provide a lithium manganese bismuth mixed metal oxide cathode material having the formula $Li_{0.5}MnO_2(Bi_2O_3)_{0.06}$ as the positive electrode in rechargeable lithium and lithium ion electrochemical cells.

These and other objects and can now be advantageously attained by reacting $MnO_2$, a lithium compound and a bismuth compound for the lithium battery cathode of the present invention. These objects can also achieved by reacting $MnO_2$, lithium, or a compound containing lithium and bismuth, or a compound containing bismuth. Manganese based mixed metal oxides with lithium and bismuth were initially examined as a cathode material for rechargeable lithium and lithium-ion batteries in order to provide a new mixed metal oxide cathode material as the positive electrode in rechargeable lithium and lithium ion electrochemical cells. A stable mixed metal oxide was fabricated through a solid-state reaction between manganese dioxide, a lithium compound and bismuth or a bismuth compound. The devices of the present invention provided much improved sustained specific capacity of about 120 mAhrs/g, and the material exhibited an inherent catalytic behavior for charge transfer.

DETAILED DESCRIPTION OF THE DRAWINGS

Figure 1:
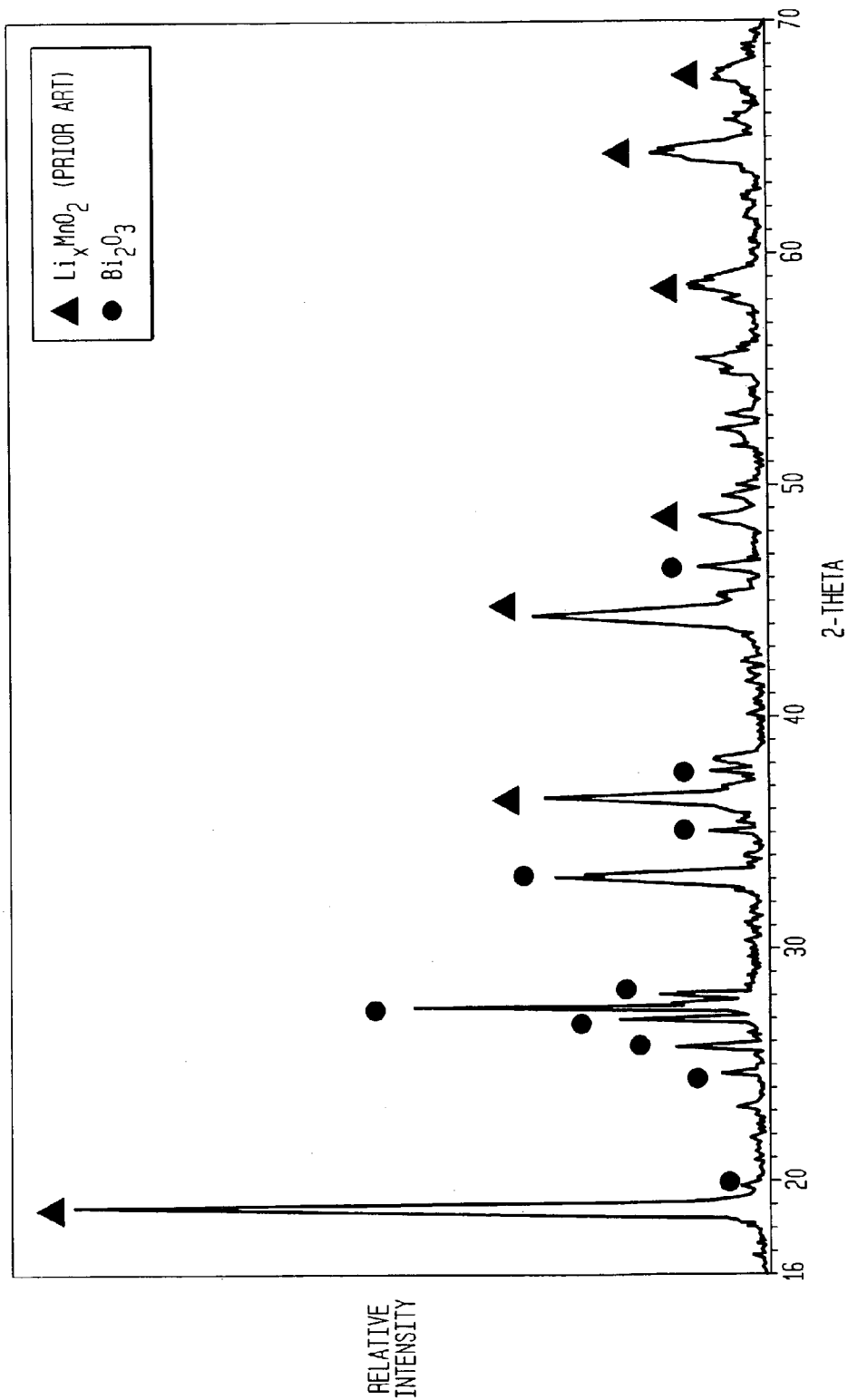
FIG. 1 is a chart displaying the X-ray diffraction patterns for lithium bismuth manganese dioxide based cathode materials, $Li_xMnO_2(Bi_2O_3)_y$, compound of the present invention.

The lithium bismuth manganese dioxide based materials of the present invention advantageously provide cathode materials that answer the long-felt need for a fully reversible lithium battery without suffering from any of the drawbacks, limitations and disadvantages of prior art phase changing batteries. In order to resolve the reversibility problem, electrochemical measurements were performed on rechargeable lithium batteries using lithium manganese bismuth mixed metal oxide as the positive electrode. These measurements identified increased discharge potential for the Li/Li$_x$MnO$_2$(Bi$_2$O$_3$)$_y$ electrochemical couple and suppressed charge potentials for the Li/Li$_x$MnO$_2$(Bi$_2$O$_3$)$_y$ compound. Changes in cell behavior as a function of bismuth stoichiometry in MnO$_2$, as well as cell discharge and charge properties with respect to the bismuth and lithium stoichiometry, were also measured. Preliminary results indicated that Li/Li$_x$MnO$_2$(Bi$_2$O$_3$)$_y$ electrochemical cells would produce the required reversibility and still meet other significant lithium battery operational objectives, without suffering from the setbacks, limitations and disadvantages of rigid stoichiometry electronic control, phase change and loss of reversibility associated with prior art lithium batteries.

The present invention provides a lithium manganese bismuth mixed metal oxide cathode material through a solid-state reaction between manganese dioxide, a lithium compound and either bismuth or a bismuth compound in a compound having the general formula Li$_x$MnO$_2$(Bi$_2$O$_3$)$_y$. This Li$_x$MnO$_2$(Bi$_2$O$_3$)$_y$ compound affords charge transfer catalytic behavior that allows the cathode to be fully reversible at suppressed charge potentials and increased discharge potentials. Li$_x$MnO$_2$(Bi$_2$O$_3$)$_y$ material is incorporated into an electrochemical cell with either a lithium metal or lithium ion anode and an organic electrolyte. In one embodiment, the cathode of the present invention comprises a compound with the general formula Li$_x$MnO$_2$(Bi$_2$O$_3$)$_y$ affording charge transfer catalytic behavior that allows the cathode to be fully reversible. In the preferred embodiment, a cathode comprising Li$_x$MnO$_2$(Bi$_2$O$_3$)$_y$ where subscript x is between 0.45 and 0.55, subscript y is between 0.025 and 0.075 and the reversible region for x is between 0.4 and 1.0 is provided. The cathodes of this invention answer the long-felt need for a reversible cathode for rechargeable lithium batteries without suffering from the shortcomings, limitations and disadvantages of, rigid stoichiometry electronic control, phase change and loss of reversibility.

The bismuth mixed metal oxide cathode material of the present invention was developed through a solid state reaction between manganese dioxide, a lithium compound and either bismuth or a bismuth compound, and the general formula for the compound is Li$_x$MnO$_2$(Bi$_2$O$_3$)$_y$ where subscript x is between 0.45 and 0.55, subscript y is between 0.025 and 0.075 and the reversible region for x is between 0.4<x<1.0. In accordance with the present invention, this compound provides the necessary reduced charge transfer impedance due to catalytic activity. This reduced charge transfer impedance provides a lower potential charge mechanism to allow the cathode to be fully reversible and thereby overcome the shortcomings, disadvantages and limitations of prior art non-reversible lithium batteries. In accordance with the present invention, the Li$_x$Bi$_y$MnO$_{2+z}$ material is used as a lithium battery cathode and is then mixed with conductive carbon and a binder to fabricate a battery cathode. An electrochemical cell is then fabricated with either a lithium metal or lithium ion anode and an organic electrolyte and this invention's mixed metal oxide cathode.

The preferred embodiment is a cathode material comprising an Li$_{0.5}$MnO$_2$(Bi$_2$O$_3$)$_{0.06}$ compound that provides an optimal electrochemical cell performance of increased energy per gram of active Li$_x$MnO$_2$(Bi$_2$O$_3$)$_y$ material and a lower over potential on charge increasing the cells overall efficiency, without suffering from the rigid stoichiometry electronic control and loss of reversibility of prior art cells.

Active starting material with stoichiometries of Li$_{0.5}$MnO$_2$(Bi$_2$O$_3$)$_{0.06}$ was used to demonstrate the viability of this material, other stoichiometries of Li$_x$MnO$_2$(Bi$_2$O$_3$)$_y$ can also be used to optimize the cell performance and are considered to be within the contemplation of this invention. Similarly, variations in heat treatment sequences, Li$_x$MnO$_2$(Bi$_2$O$_3$)$_y$ fabrication techniques, other bismuth-doped metal oxides for lithium batteries and other factors could also result in optimal cell performance.

Manganese based mixed metal oxides with lithium and bismuth was initially examined as a cathode material for rechargeable lithium and lithium-ion batteries in order to provide a new mixed metal oxide cathode material as the positive electrode in rechargeable lithium and lithium ion electrochemical cells. A stable mixed metal oxide was fabricated through a solid-state reaction between manganese dioxide, a lithium compound and bismuth or a bismuth compound. Lithium manganese bismuth mixed metal oxide cathode material of the present invention resulted in a sustained specific capacity of 120 mAhrs/g. Further, the material of the present invention also exhibited an inherent charge transfer catalytic behavior. The devices and materials of the present invention provide a lower potential charge mechanism that reduces the charge transfer impedance of the system.

Figure 2:
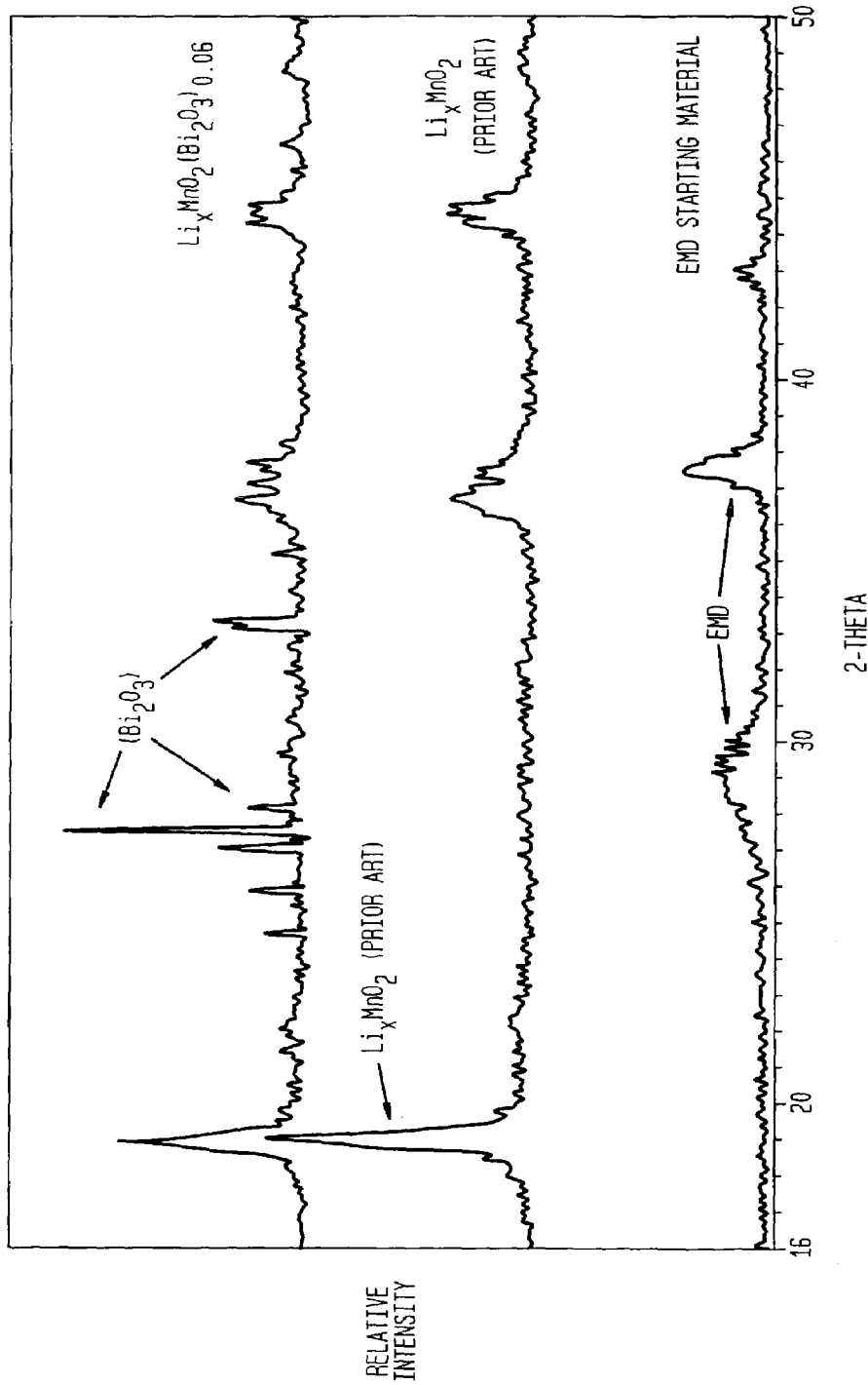
FIG. 2 is a chart comparing X-ray diffraction patterns of a prior art compound, EMD starting material and the lithium bismuth manganese dioxide based cathode materials $Li_xMnO_2(Bi_2O_3)_y$ compound of the present invention.

Referring now to the drawings, FIG. 1 is a chart showing the X-ray diffraction pattern for the Li$_x$MnO$_2$(Bi$_2$O$_3$)$_y$ compound of this invention. FIG. 2 is a chart comparing a prior art compound's X-ray diffraction patterns with three manganese based metal oxide cathode materials for lithium batteries compound of the present invention: MnO$_2$ (EMD), Li$_x$MnO$_2$, and Li$_x$MnO$_2$(Bi$_2$O$_3$)$_y$. The higher number of diffraction peaks for the Li$_x$MnO$_2$(Bi$_2$O$_3$)$_y$ compound of this invention shown in this chart indicates the influence of bismuth in the Li$_x$MnO$_2$ structure.

Figure 3:
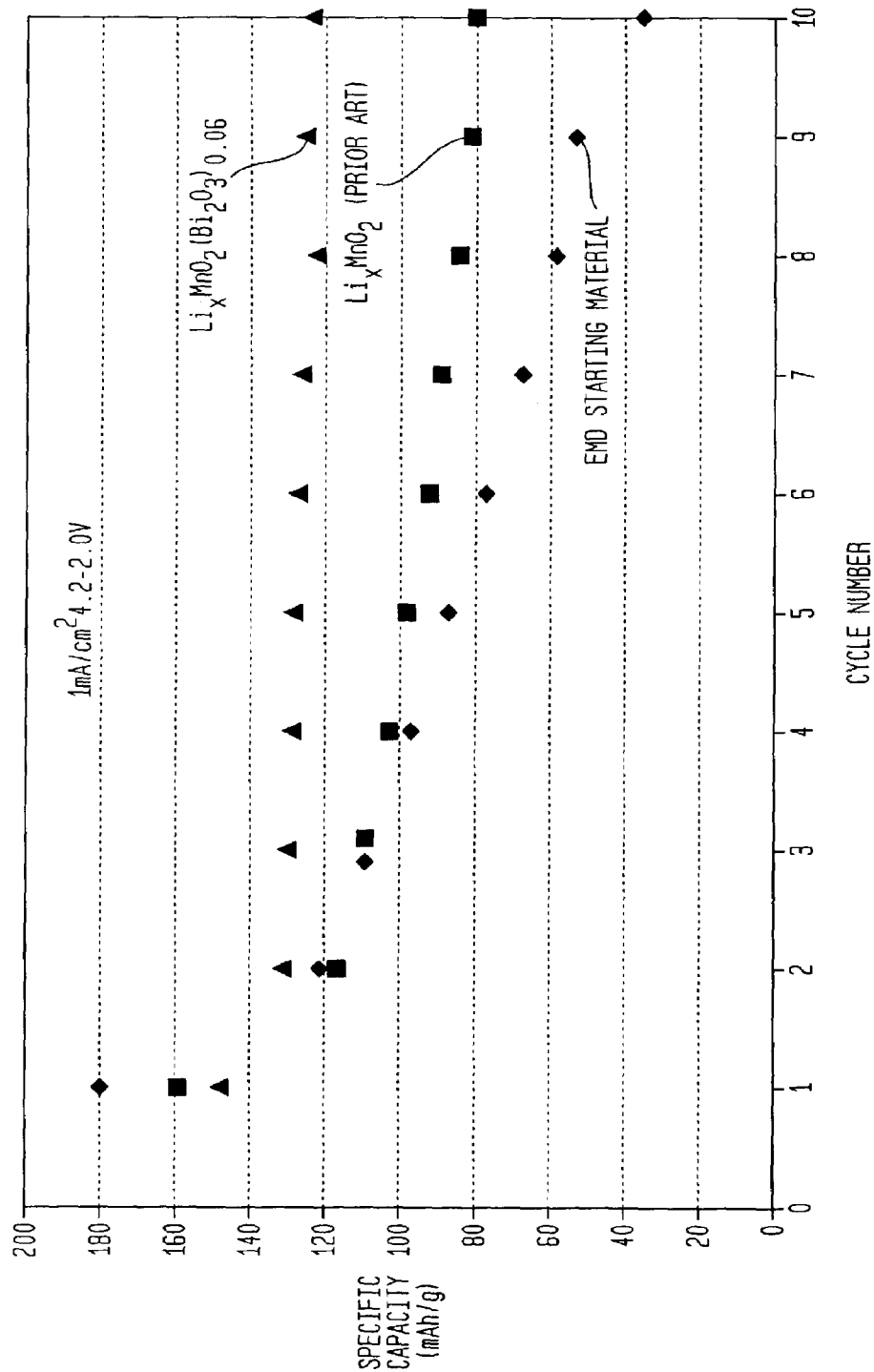
FIG. 3 is a chart comparing the 1.0 mA/cm² discharge capacity for three cells composed of the $Li_xMnO_2(Bi_2O_3)_y$ compound of the present invention, an $Li_xMnO_2$ prior art compound and EMD starting material.

FIG. 3 is a chart comparing the successive specific discharge capacity of cells with three manganese based metal oxide cathode materials for lithium batteries compound of the present invention: MnO$_2$ (EMD), Li$_x$MnO$_2$, and Li$_x$MnO$_2$(Bi$_2$O$_3$)$_y$. The chart shows the sustained specific capacity at 120 mA-hr/g of the present invention in a Li/Li$_{0.5}$MnO$_2$(Bi$_2$O$_3$)$_{0.06}$ cell as compared to the fading specific capacity for prior art Li/Li$_x$MnO2 and Li/MnO$_2$.

Figure 4:
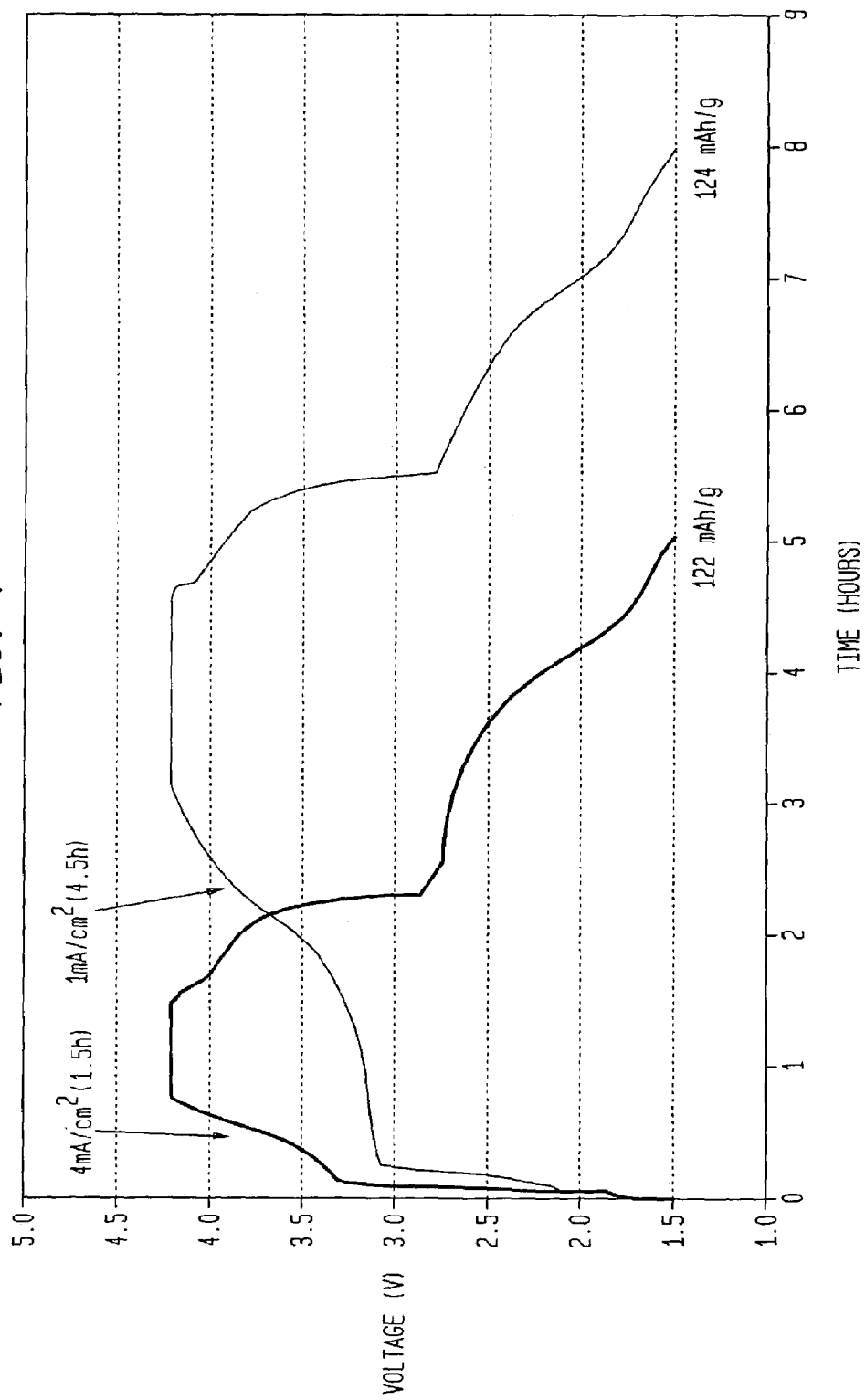
FIG. 4 is a chart comparing two cycles of a cell composed of a lithium anode and a $Li_xMnO_2(Bi_2O_3)_y$ cathode of the present invention with two different charge rates.

FIG. 4 is a chart showing the ability of the Li$_x$MnO$_2$(Bi$_2$O$_3$)$_y$ compound of this invention to accept a fast charge. The discharge curves depicted in the figure shows two cycles, one where the cell was charged at 4 mA/cm$_2$ and the other at 1 mA/cm$_2$. The discharge rate was maintained at a constant 1 mA/cm$_2$ showing comparable discharge capacities for the two different charge rates.

The Li$_x$MnO$_2$(Bi$_2$O$_3$)$_y$ cathode material of the present invention was prepared through a solid-state reaction. In general terms, Li$_x$MnO$_2$(Bi$_2$O$_3$)$_y$ was prepared by mixing MnO$_2$, Li$_2$CO$_3$ and Bi$_2$O$_3$ then heating the mixture in an annealing oven for 18 hours. The introduction of lithium into the material was accomplished through the use of LiOH, Li$_2$O$_2$ or Li$_2$O replacing Li$_2$CO$_3$ and the introduction of bismuth was accomplished through the use of bismuth metal replacing Bi$_2$O$_3$ in the general preparation. After preparation, the materials were characterized with X-ray diffraction. This process shows MnO$_2$ as the starting material in the Li$_x$MnO$_2$(Bi$_2$O$_3$)$_y$ preparation to indicate the final product stoichiometry, but other manganese oxides, such as Mn$_2$O$_3$ and Mn$_3$O$_4$, would also yield similar results. X-ray diffraction was used to analyze both the intermediate and final product after the heat treatment step.

The experimental cells were composed of a lithium anode separated from a Teflon bonded cathode with a nonwoven glass separator. The cathode was fabricated by mixing together active manganese based cathode material, carbon and Teflon in a 87:9:4 ratio. The cathode mix was then rolled to 0.03 cm and dried in a vacuum oven. 0.075 cm thick lithium foil was cut using a 1.5 cm diameter hole punch. The cathode was also cut to with a 1.5 cm diameter hole punch. A 0.01 cm nonwoven glass separator was utilized for the separator and as a wick. The electrolyte used was 1 molar $LiPF_6$ in proportional mixtures of dimethyl carbonate and ethylene carbonate.

Preparation of the $Li_xMnO_2(Bi_2O_3)_y$ compounds of the present invention was achieved through a solid-state reaction between manganese dioxide, bismuth metal and lithium carbonate. $Li_xMnO_2(Bi_2O_3)_y$ was prepared by mixing stoichiometrically $MnO_2$, Bi and $Li_2CO_3$ and heating in an annealing oven for at least 18 hours at 500° C. The $Li_xMnO_2$ prior art sample was prepared similarly with the omission of the bismuth metal in the mixture.

Evaluation of the $Li_xMnO_2(Bi_2O_3)_y$ electrochemical couple was initiated with a basic chronopotentiometry experiment conducted with a liquid electrolyte cell. All the $Li_xMnO_2(Bi_2O_3)_y$, $Li_xMnO_2$ and the $MnO_2$ material were used to fabricate cathodes. Cathodes were fabricated by mixing the active material, with carbon and Teflon in an alcohol base. The ratio of materials not including the alcohol was 87:9:4 active material:carbon:Teflon. The cathode mix was rolled to 0.03 cm and dried in a vacuum oven. Lithium foil was cut using a 1.5 cm diameter hole punch. The cathode was also cut using a 1.5 cm diameter hole punch. A 0.01 cm nonwoven glass separator was utilized as a wick as well as separator.

Cells composed of the compounds of this invention were prepared by separating a lithium anode from a Teflon bonded cathode with a nonwoven micro porous glass separator (Corning). The electrolyte used was 1 molar $LiPF_6$ in proportional mixtures of dimethyl carbonate and ethylene carbonate.

The cells were cycled with an ARBIN Model BT-2043 Battery Test System. A two-step charge profile was used. The charge profile consisted of a constant current charged at 2.0 mA (1.2 mA/cm$^2$) or 1.0 mA (0.53 mA/cm$^2$) to 4.2 volts followed by an applied constant voltage of 4.2 volts. The constant voltage was maintained for 5 hours or until the charge current dropped to 10% of the initial constant current value. The cells were discharged at 2.0 or 1.0 mA to 1.5 to 2.0 volts. A rest period of 5 minutes between charge and discharge cycles allowed for the cells to equilibrate.

Those skilled in the art will readily understand that although active starting material with a stoichiometry of $Li_{0.5}MnO_2(Bi_2O_3)_{0.06}$ was used to demonstrate the viability of this material, other stochiometries of $Li_xMnO_2(Bi_2O_3)_y$ could be used to optimize the cell performance. Similarly, other sequences of heat treatments, manufacturing techniques and fabrication of $Li_xMnO_2(Bi_2O_3)_y$, as well as other bismuth-doped metal oxides could be readily used to optimize the cell performance.

A number of variations of the present invention are possible. For example, the devices of the present invention include a cathode material, a cathode and a lithium electrochemical device. Also, the present invention contemplates bismuth-manganese mixed metal oxide having the formula $Li_xMn_2O_4(Bi_2O_3)_y$. Other variations in coulumbic efficiency, initial specific capacity, discharge capacity and energy efficiency charge are also possible. Additionally, the cathode material and cathodes can be employed with a battery.

Additionally, while several embodiments have been illustrated and described, it will be obvious to those skilled in the art that various modifications may be made without departing from the spirit and scope of this invention.

We claim:

1. A rechargeable lithium electrochemical system, comprising:
   a lithium anode;
   a mixed metal oxide cathode;
   an $LiPF_6$ organic electrolyte;
   said cathode being composed of a positive, active lithium manganese bismuth mixed metal oxide compound having the general formula $Li_xMnO_2(Bi_2O_3)_y$, where said subscript x is greater than 0.45 and less than 0.55 and said subscript y is greater than 0.025 and less than 0.075;
   said mixed metal oxide compound resulting from a solid-state reaction between manganese oxide, a lithium compound and $Bi_2O_3$;
   said manganese oxide being selected from the group of manganese oxides consisting of $MnO_2$, $Mn_2O_3$ and $Mn_3O_4$;
   said lithium compound being selected from the group of lithium compounds consisting of $Li_2CO_3$, LiOH, $Li_2O_2$ and $Li_2O$;
   said mixed metal oxide compound being in solid form and having a reversible region for said subscript x greater than 0.4 and less than 1.0;
   said cathode providing a sustained specific capacity of about 120 mAhrs/g;
   said mixed metal oxide compound having a reduced charge transfer impedance due to a catalytic reaction causing said cathode to prevent an overcharge and prevent a phase change;
   said mixed metal oxide compound, a conductive carbon and a binder being mixed in a predetermined ratio; and
   said cathode being fully reversible against said lithium compound.

2. The rechargeable lithium electrochemical system, as recited in claim 1, further comprising:
   said solid-state reaction being caused by mixing $MnO_2$, $Li_2CO_3$ and $Bi_2O_3$;
   said predetermined ratio being 87:9:4; and
   said mixed metal oxide compound having the formula $Li_{0.5}MnO_2(Bi_2O_3)_{0.006}$.

3. The rechargeable lithium electrochemical system, as recited in claim 2, further comprising said system being a lithium battery.

4. The rechargeable lithium electrochemical system, as recited in claim 1, further comprising said anode being a lithium metal.

5. The rechargeable lithium electrochemical system, as recited in claim 1, further comprising said anode being a lithium ion.

6. The rechargeable lithium electrochemical system, as recited in claim 1, further comprising said system being a lithium ion electrochemical system.

7. A rechargeable lithium battery, comprising:
   an anode;
   a mixed metal oxide cathode;
   an $LiPF_6$ electrolyte;
   said cathode being composed of a positive, active lithium manganese bismuth mixed metal oxide compound having the general formula $Li_xMnO_2(Bi_2O_3)_y$, where said subscript x is greater than 0.45 and less than 0.55 and said subscript y is greater than 0.025 and less than 0.075;

said mixed metal oxide compound resulting from a solid-state reaction between manganese oxide, a lithium compound and $Bi_2O_3$;

said manganese oxide being selected from the group of manganese oxides consisting of $MnO_2$, $Mn_2O_3$ and $Mn_3O_4$;

said lithium compound being selected from the group of lithium compounds consisting of $Li_2CO_3$, $LiOH$, $Li_2O_2$ and $Li_2O$;

said mixed metal oxide compound being in a solid form and having a reversible region for said subscript x greater than 0.4 and less than 1.0;

said cathode providing a sustained specific capacity of about 120 mAhrs/g;

said mixed metal oxide compound having a reduced charge transfer impedance due to a catalytic reaction causing said cathode to prevent an overcharge and prevent a phase change;

said mixed metal oxide compound, a conductive carbon and a binder being mixed in a predetermined ratio; and said cathode being fully reversible against said lithium compound.

8. The rechargeable lithium battery, as recited in claim 7, further comprising:

said solid-state reaction being caused by mixing $MnO_2$, $Li_2CO_3$ and $Bi_2O_3$;

said predetermined ratio being 87:9:4; and said mixed metal oxide compound having the formula $Li_{0.5}MnO_2(Bi_2O_3)_{0.06}$.

9. The rechargeable lithium battery, as recited in claim 8, further comprising said anode being composed of a lithium metal.

10. The rechargeable lithium battery, as recited in claim 7, further comprising said anode being composed of a lithium ion.

11. The rechargeable lithium battery, as recited in claim 7, further comprising said battery being a lithium ion battery.

* * * * *